Dec. 3, 1963    L. J. NEWTON ETAL    3,113,065
RESIN BONDED FIBREBOARD AND THE PROCESS OF MAKING THE SAME
Filed June 12, 1961
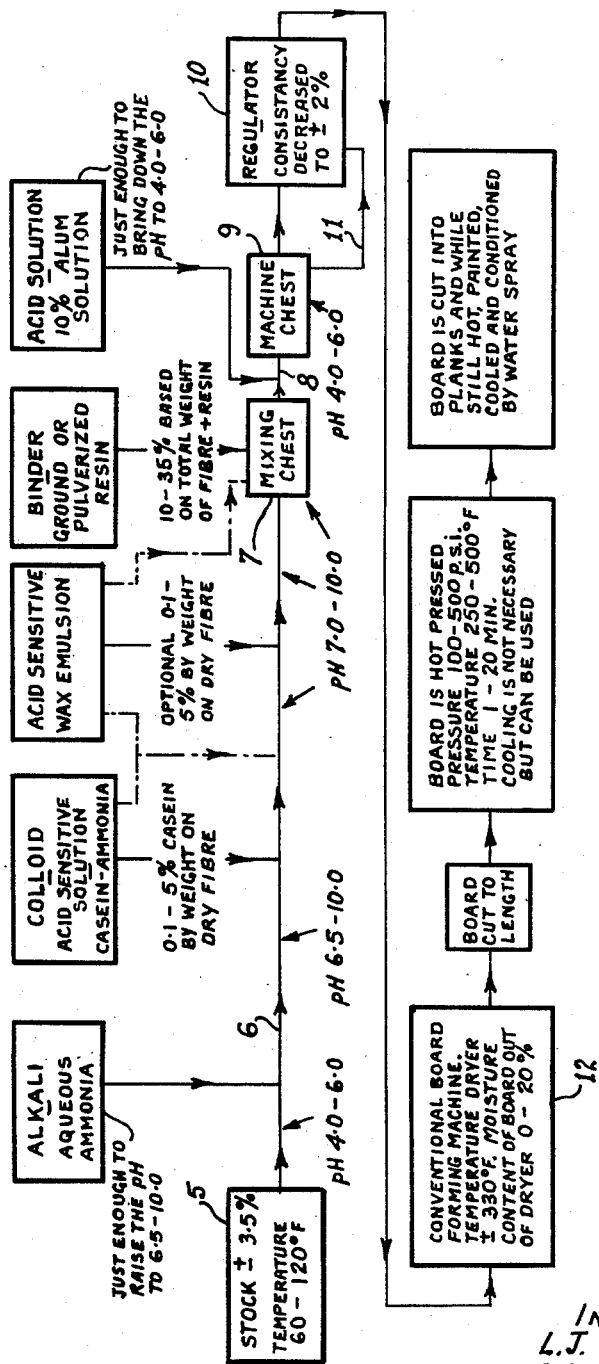
INVENTORS
L. J. NEWTON
C. DE. JONG
BY Fetherstonhaugh & Co.
ATTORNEYS

United States Patent Office 3,113,065
Patented Dec. 3, 1963

3,113,065
RESIN BONDED FIBREBOARD AND THE PROCESS OF MAKING THE SAME
Leslie J. Newton, Baie d'Urfe, Quebec, and Cornelis De Jong, Acton, Ontario, Canada, assignors to Building Products Limited, Montreal, Quebec, Canada
Filed June 12, 1961, Ser. No. 116,615
9 Claims. (Cl. 162—164)

This invention relates to the manufacture of resin bonded fibreboard in which the retention of the resin as a binder for the fibres is of a high value and the finished board has low water absorption, high modulus of rupture and high dimensional stability characteristics.

The invention consists essentially in the admixture of a fibre slurry with thermoplastic or thermosetting resin binders, either singly or in an admixture with each other, the resin binders being mixed with a colloid as a carrier, and wet forming a board from the fibre-resin slurry, subjecting the formed board to high pressure at high temperature and then cooling and conditioning the board by a water spray.

The use of resin as binding agents for fibres has been known, but the loss of the binder in the forming of the finished product has been considerable with the result that the finished product did not have the high value of characteristics which was desired. Various methods of applying the resin binder have been employed, such as impregnating ready-made products with a solution of the resin and impregnation of ready-made products with a hot melt of the resin. Such methods have only had limited success as the resin penetration was spotty and left undetermined areas under the surface of the article without any resin binder. Furthermore, penetration of the resin into the article was only partially successful with thin caliper articles thereby placing a limit on the type and thickness of articles that could be so treated. Other methods, such as mixing the resin with the fibres have been tried with limited success, showing a resin retention of between 70% and 80%. With such limited retention of resin in the article, the article shows unacceptable swelling and water pick-up when pressed at high temperatures of the order of 400–500° F. The particle size of the resin binder also had some influence in that the retention of resin in the article worsens as the particle size decreases.

In order to improve the retention of resin to at least about 90%, we used an acid sensitive colloid, that would act like a glue for fibres and resins when used in acid surroundings. To do this in practice two different systems can be followed. First of all to mix the colloid or solution with the resin, either dry or in a slurry and then add this mixture to the wood fibre slurry. Secondly, to mix the colloid or solution in the wood fibre slurry before the resin is added. Our tests have shown that the second method is the most effective as the first method tends to agglomerate the resin instead of spreading it over the fibres.

The object of the invention is therefore to produce a fibreboard which will have a high retention of resin in the finished product, the retention of resin being at least 90%.

A further object of the invention is to so combine the resins and fibres in a board article that a very small percentage will be pressed out or washed out in the subsequent finishing and conditioning of the board.

A further object of the invention is to produce a fibreboard having low water absorption, good modulus of rupture and high dimensional stability characteristics.

These and other objects of the invention will be apparent from the following description of the manner in which the fibreboard is manufactured.

The steps in the manufacture of the resin bonded fibreboard are set forth in the accompanying flow chart in which well known and commonly used types of board forming machinery are used.

Referring to the attached flow sheet which is typical of the process, the fibre stock is prepared with any desired type of fibre or mixture of fibres depending upon the type of finished board and its characteristics and properties desired. The fibre stock is prepared in the stock tank 5 and is preferably a slurry of approximately 3.5% solids content and maintained at a temperature of between 60° F. and 120° F. The pulp slurry as prepared in the stock tank 5 has a pH which varies between 4.0 and 6.0.

The prepared slurry is then pumped through the line 6 to the mixing chest 7. In order to raise the pH of the slurry to a value of between 6.5 and 10.0 an alkali is injected into the slurry. As alkali which can be used are a solution of sodium silicates, soda ash, lime, or ammonia. Ammonia can also be injected into the slurry in gas form. Preferably ammonia is used, because with drying and hot pressing of the board any trace of waste-soluble ammonia salt, which is bad for dimensional stability, is evaporated. The amount of alkali used depends wholly on the pH desired at this stage.

After the pH of the slurry has been raised to the desired value between 6.5 and 10.0, an acid-sensitive colloid is added to the slurry in the line 6. There are a number of colloids that fall into this class; preferably an ammoniated casein solution is used. Other examples are solutions of corn protein, soya bean protein, cottonseed protein, animal glue or alginates such as is sold under the trade name Kelsize. All should be treated with alkali. Certain forms of starch can also be used. The amounts of the colloid solution may vary from about 0.1% to about 5.0%. The percentage is based on the weight of the dry fibres. A percentage of between 0.5% and 1.0% is recommended. The casein ammonia solution is made up in the conventional way by mixing powdered casein, particle size of about 80 mesh, with warm water at a temperature of 140° F. to 180° F. for about 5 to 10 minutes. A ratio of 1 part of casein to 5 parts of water is recommended. To this mixture is added about 1 part of 28% ammonia for every 5 parts of casein. After the ammonia is added the mixture is mixed for another 5 to ten minutes.

In order to increase the dimensional stability of the finished product an acid sensitive wax emulsion can be added to the pulp slurry. The wax emulsion is diluted just before using to approximately 10% and can be mixed with the colloidal solution or injected into the line 6 separately or added to the slurry in the mixing chest 7. The quantities of the acid sensitive wax emulsion may vary between about 0.1% to about 5% on the dry weight of the fibres. Two examples of the acid sensitive wax emulsions which can be used are, Paracol 500A as sold by Hercules Powder Co. or Alwax 204 as sold by Cyanamid of Canada Limited.

A binder is now added to the mixture in the mixing chest 7. Thermoplastic binders which can be used are used singly or in admixture with each other. The binders include, for example, the various grades of asphalt and a variety of natural asphalt known as Gilsonite; the thermoplastic cellulose esters, such as cellulose acetate; the thermoplastic polyvinyl resins; including polyvinyl chloride, polyvinyl acetate and copolymers thereof; thermoplastic alkyd resin; the thermoplastic polystyrenes; and rosin. Also suitable are those resinous condensation products of urea and aldehyde and of a phenol and an aldehyde for example, the phenol formaldehyde resins which at least in the preliminary stages of the pressing operation on the resulting board are thermoplastic in properties. A binder which is well suited for this use is the extracted pine wood pitch product described in Perry's U.S. Patent No. 2,503,407 and sold under the trademark of "Vinsol" resin. This is a by-product of the production of wood rosin from pine wood being the residue remaining after removal of the turpentine by distillation and of the rosin by solvent extraction with a hydrocarbon solvent such as gasoline. "Vinsol" has the following approximate properties (percent being expressed by weight)

| | |
|---|---|
| Acid number | 94 |
| Saponification number | 165 |
| Melting point (Hercules drop method) °F | 240 |
| Unsaponifiable matter percent | 7.7 |
| Gasoline insoluble do | 83 |
| Petroleum ether insoluble do | 98 |

Other pine wood resins may be employed.

The binder resin is used in a pulverized or finely ground state either dry or wet. However, to impart the best mixing results the resin should be used as a water slurry—a 50% (percent by weight) slurry will work well as the resin will not have a tendency to settle. Different particle sizes and different ranges of particle sizes of the resin can be used and the amount should be between 10% and 35% based on the total weight of fibre+resin. The mixture in the mixing chest should still have a pH value of between 7.0 and 10.0.

The stock is pumped through the line 8 from the mixing chest 7 to the machine chest 9. In order to bring down the pH value of the stock at this point a 10% alum solution is added to the stock in the line 8. This alum solution however can be also added at other places such as directly into the machine chest 9 or into the regulator 10. The quantity of alum solution used depends on the desired pH which may vary between 4.0 and about 6.0 (a pH of 4.6 is preferable) and on the amount of alkali injected into the pulp slurry at the beginning of the process. Other acidic precipitation agents such as sulphuric acid and the like can be used in place of the alum solution.

In the regulator, the consistency of the pulp stock is decreased to approximately 2%. A return flow line 11 is provided between the regulator 10 and the machine chest 9.

From the regulator 10 the pulp stock is fed to the conventional board forming machine 12. After the board has been formed it passes through a press section where some of the water is squeezed out. The moisture content of the wet board may vary between about 50% and about 60%. The caliper of the wet board depends on the desired thickness and density of the finished board. The wet board is then dried in a forced hot air dryer section which has a temperature of about 330° F. Higher or lower temperatures may be used depending on the speed of the dryer and the density and caliper of the board. The moisture content of the dried board should be between 0.0% and 20.0%.

After the board has passed through the dryer section the board is trimmed and transported to the hot press, the temperature of which is between 250° F. and 500° F., preferably at a temperature of about 450° F. The pressure used during the hot pressing operation can vary between 100 and 500 p.s.i. and the time of pressing between 1 and 20 minutes. For a board in which a Vinsol resin binder is used it has been preferable to use a pressure of approximately 200 p.s.i. and a temperature of approximately 450° F. and a time of about 10 minutes, and a moisture content of about 6% before pressing. It is advisable to use a screen on one side of the board to prevent blistering of the board.

When the board is pressed and removed from the press it it trimmed and then stacked in a conditioning room. However, it could be cut into planks and while still hot, be painted on both sides and on all edges. After painting, conditioning of the boards or planks is necessary and a fast and reliable method is to spray water on the painted board.

Having now explained the method by means of which the resin bonded board is manufactured the following examples of actual board manufacture are given.

*Example I*

In the preparation for the manufacture of board in this example a laboratory test of the casein-ammonia solution was tried to determine the increase of Vinsol binder retention.

Into a ten gallon vat, 450 grams of dry Bauer pulp was mixed with 8 gallons of water. The temperature of the water was 95° F. To this mixture 3 ml. of 28% aqueous ammonia were added to raise the pH value of the pulp slurry to about 7.5. 45 grams of a 10% solution of casein-ammonia was then added to the slurry, i.e. 4.5 grams of dry casein and 0.9 gram of 28% aqueous ammonia. After 3 minutes of good mixing, a binder comprising 300 grams of a 50% water Vinsol slurry was added to the pulp slurry, the Vinsol being in pulverized form as received from the manufacturer. After 10 minutes of mixing, 100 grams of a 10% alum solution were added, and from the resulting mixture, a board was formed in a laboratory deckle box (size 12″ x 12″). The screen in the deckle box was 16 mesh and the vacuum used was about 9 p.s.i. below atmospheric pressure.

The resulting board was placed between two felts and pressed at 400 p.s.i. to remove the excess water, and then placed in an oven at 350° F. After 3½ hours, the board had a moisture content of 7% and was removed from the oven. After the board was dried overnight in a 140° F. oven, the bone dry board was weighed and a small sample was taken for the extraction test. In a Soxhlet apparatus used for the continuous extraction of solid substances with a solvent, 5 grams of this board was extracted with acetone and a Vinsol content of 24.6% by weight was found.

The weight of the board was 576.5 grams so, of this board, 24.6% of 576.5 grams was Vinsol, that is, 141.8 grams. Therefore, during the forming of this board 8.2 grams of Vinsol was lost, thus meaning a retention of 95.4% of Vinsol in the board.

*Example II*

In Example II the same procedure was used in forming a board. The same quantities of pulp and Vinsol were used and the casein ammonia solution was omitted. A Vinsol retention in the board of 70.4% was found.

*Example III*

In Example III the same procedure as in Example II was carried out except that 4.5 grams of rosin size was added. A Vinsol retention in the board of 76% was found.

*Example IV*

Example IV was a plant test run made under the conditions outlined in explaining the accompanying flow sheet.

A 3.5% solids slurry containing 4800 lbs. of 100% Bauer stock was prepared in the tank 5, the stock having a pH value of 5.7. To this was added 1 gallon of 28% aqueous ammonia, which changed the pH value of the stock to 7.3, followed by 37 gallons of a 10% casein ammonia solution (for every part of casein, ⅕ part of 28% aqueous ammonia). The pH value of the stock at this time was 7.5. Now 675 lbs. of a 10% wax emulsion (Paracol 500A) were added and after a 5′ minutes mixing in the mixing chest 7, 3200 lbs. of a 50% water-Vinsol slurry was added. To the resulting slurry a 10% alum solution was added between the mixing chest 7 and machine chest 9 and the pH value became between 4.7 and 4.6. From this stock the boards were formed and dried for 3 hours in the dryer at 350° F. Analysis of the finished boards showed a Vinsol content of between 23.0% and 24.3% by weight. This is equivalent to a retention of the Vinsol in the board of between 90.7% and 97%.

The boards resulting from the test run of Example IV were pressed at different temperatures. One of the boards was pressed at 440° F. for 12 minutes and the following data were found:

Density _____ lbs. per cu. ft__ 37.5
Caliper _____ inches__ 0.450
Modulus of rupture:
   (a) Machine direction _____ p.s.i__ 1880
   (b) Across machine direction _____ p.s.i__ 1690

Water pick-up on immersion in water:

| | Percent by weight |
|---|---|
| 2 hours | 2.2 |
| 24 hours | 8.7 |
| 48 hours | 11.5 |
| 7 days | 35.0 |

Caliper expansion on immersion in water:

| | Percent |
|---|---|
| 2 hours | 0.97 |
| 24 hours | 3.90 |
| 48 hours | 5.80 |
| 7 days | 7.20 |

These figures show a strong and a diamensionally stable board.

The results of these tests disclose that a board made as above described in which an acid sensitive colloid is added to the slurry, ensures that a higher percentage of resin is retained in the board after processing and that the resulting board has greater stability and strength than has been obtainable with other methods of binding fibrous boards.

What we claim is:

1. The process of manufacturing fibreboard which comprises forming a slurry of fibres of approximately 3.5% solids, adjusting the pH of said slurry with alkali to a value between 6.5 and 10.0, adding an acid sensitive colloid protein solution of from 0.1% to about 5.0% by weight of dry fibre and an acid sensitive wax emulsion of from 0.1 to 5.0% by weight of dry fibres in the slurry and a resin binder of between 10% and 35% of the total weight of dry fibre plus the resin binder, treating the resulting slurry to bring the pH value thereof to a value of between 4.0 and 6.0, forming the slurry into a board, subjecting the formed board to hot pressing and, while the board is still hot, applying paint thereto, and subjecting the painted board to a water spray.

2. The process of manufacturing fibreboard as set forth in claim 1, in which the alkali, raising the pH value of the slurry to between 6.5 and 10 is a solution selected from the group consisting of sodium silicate, soda ash, lime and ammonia.

3. The process of manufacturing fibreboard as set forth in claim 1, in which the acid sensitive colloid is an ammoniated casein solution.

4. The process of manufacturing fibreboard as set forth in claim 1, in which the acid sensitive colloid is selected from the group consisting of solutions of corn protein, soya bean protein, cottonseed protein, animal glue and alginates.

5. The process of manufacturing fibreboard as set forth in claim 1, in which a 10% solution of alum is added to the slurry before the board is formed to lower the pH value of the slurry to between 4.0 and 6.0.

6. The process of manufacturing fibreboard as set forth in claim 1, in which the consistency of the slurry before the board is formed is regulated to approximately 2%.

7. The process of manufacturing fibreboard as set forth in claim 1, in which the board is formed under a temperature of approximately 330° F. and has a moisture content of between 0.0% and 20%.

8. The process of manufacturing fibreboard as set forth in claim 1, in which the formed board is subjected to hot pressing at a pressure of between 100 p.s.i. and 500 p.s.i. at a temperature of between 250° F. and 500° F. for between 1 to 20 minutes.

9. The process of manufacturing fibreboard which comprises forming a slurry of 3–5% solution of fibre having a pH value between 4.0 and 6.0, adding to the slurry a 28% aqueous solution of ammonia to change the pH value of the slurry of 7.5 approximately, adding to the slurry a 10% casein ammonia solution, adding a 10% wax emulsion, mixing the resulting slurry, adding a 50% water-resin binder slurry and to the resulting slurry add a 10% alum solution, bringing the pH value of the slurry to between 4.7 and 4.6, forming the resulting stock into a board and subjecting the formed board to a drying operation.

References Cited in the file of this patent

UNITED STATES PATENTS

| 1,773,201 | Rose et al. | Aug. 19, 1930 |
| 1,956,053 | Tucker | Apr. 24, 1934 |
| 2,133,693 | Greider et al. | Oct. 18, 1938 |
| 2,161,655 | Ellis | June 6, 1939 |
| 2,352,922 | Thomas | July 4, 1944 |

FOREIGN PATENTS

| 600,628 | Great Britain | Apr. 14, 1948 |
| 573,467 | Canada | Apr. 7, 1959 |